United States Patent [19]
Klein et al.

[11] Patent Number: 5,239,174
[45] Date of Patent: Aug. 24, 1993

[54] SPECTRAL INTENSITY MEASURING SYSTEM FOR MEASURING REPETITIVELY PULSED LIGHT HAVING A MULTICHANNEL DETECTOR ARRAY AND ADJUSTMENT SYSTEM INCLUDING A DIGITAL PHASE LOCKED LOOP

[75] Inventors: Raymond Klein, Romona; Kenneth Miller, Simi Valley, both of Calif.

[73] Assignee: Kollmorgen Corp., Simsbury, Conn.

[21] Appl. No.: 753,187

[22] Filed: Aug. 30, 1991

[51] Int. Cl.$^5$ .............................................. G01J 3/50
[52] U.S. Cl. .................................... 250/226; 356/328
[58] Field of Search ............... 250/226; 356/121, 326, 356/328; 307/262, 269

[56] References Cited

U.S. PATENT DOCUMENTS

| | | | |
|---|---|---|---|
| 4,795,985 | 1/1989 | Gailbreath, Jr. | 307/262 |
| 4,951,287 | 8/1990 | Wyeth et al. | 356/349 |

Primary Examiner—David C. Nelms
Assistant Examiner—T. Davenport
Attorney, Agent, or Firm—Poms, Smith, Lande & Rose

[57] ABSTRACT

The present invention is a system for optically sampling and electronically measuring the spectral intensity and integrated intensity and temporal characteristics of a repetitively or intermittently varying pulsed light source by using the electronic output of the system can be used to display the data about the characteristics of the light source, and it can also be used to insure proper synchronization between the source and a second system such as a spectroradiometer.

29 Claims, 9 Drawing Sheets

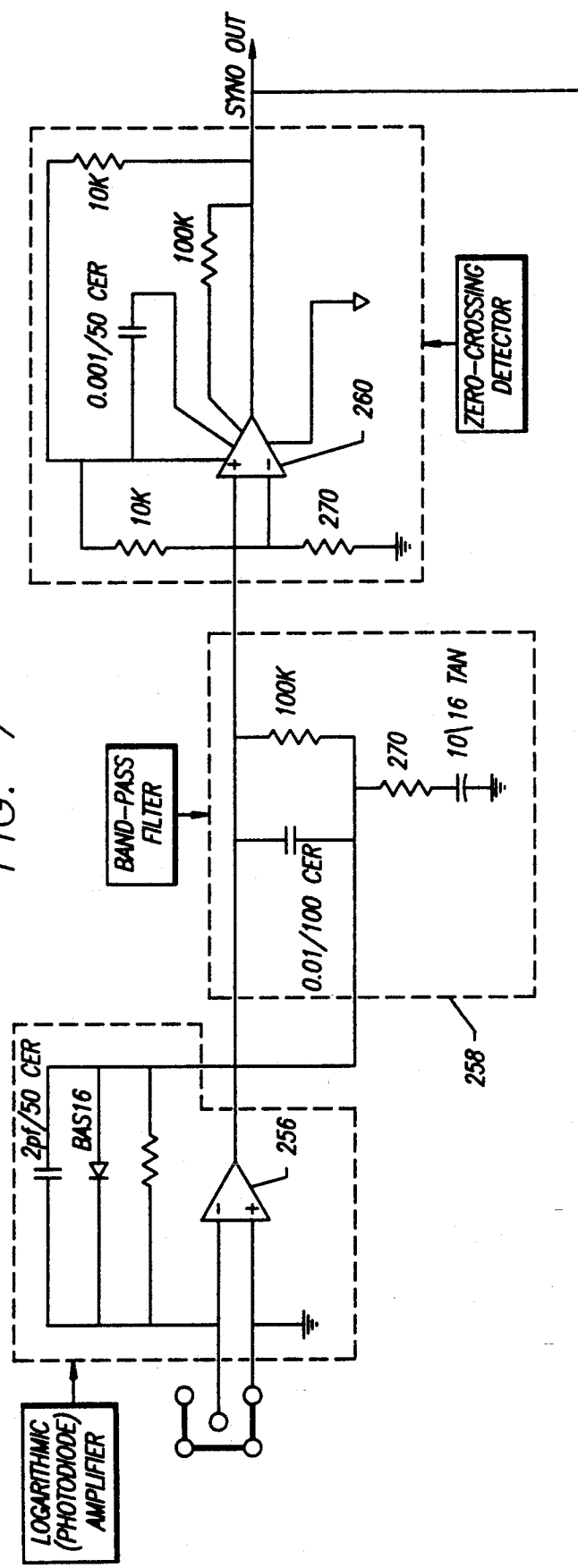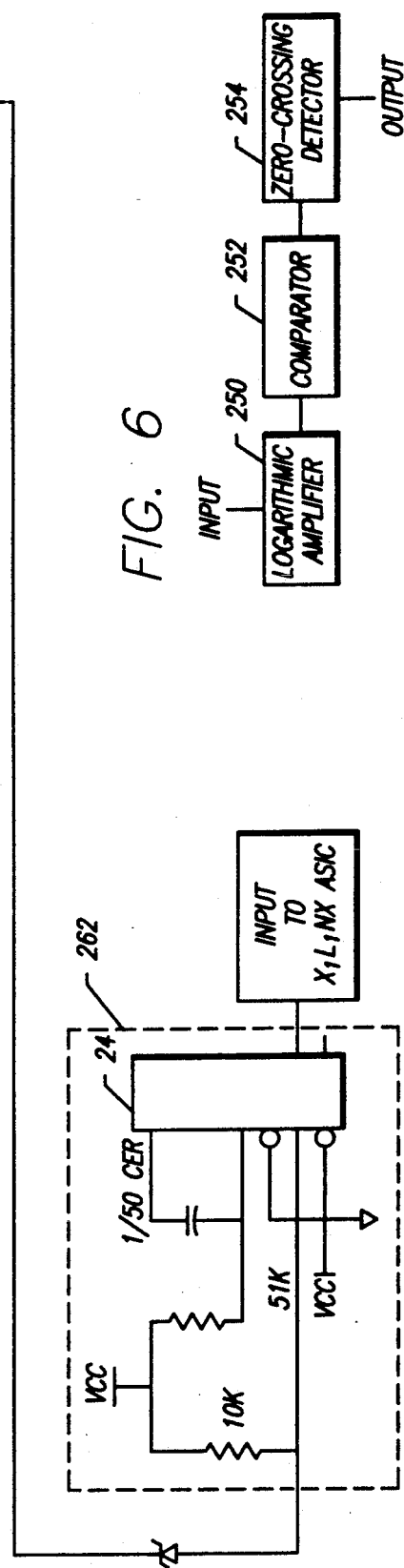

SPECTRAL INTENSITY MEASURING SYSTEM FOR MEASURING REPETITIVELY PULSED LIGHT HAVING A MULTICHANNEL DETECTOR ARRAY AND ADJUSTMENT SYSTEM INCLUDING A DIGITAL PHASE LOCKED LOOP

FIELD OF THE INVENTION

The present invention relates generally to systems which electronically measure the spectral intensity and temporal characteristics of a repetitively or intermittently varying pulsed light source using optical sampling techniques, as by product of intensity measurement the frequencies of repetitively pulsed light sources is also measured.

BACKGROUND OF THE INVENTION

Measuring the photometric brightness or color of light sources that are either intermittently or repetitively pulsed over time requires special techniques to assure accuracy. These light sources include florescent lights, xenon lamps, cathode ray tube (CRT) screens, or in general light sources that appear to have constant intensity to an observer but are in actuality pulsing faster than human senses can perceive.

The simplest approach is to integrate or average brightness or frequency measurements over a very large number of cycles or pulses (i.e., 100 or more). This method, however, can take a great deal of time, especially if the pulse repetition rate is low, and can result in errors if either the pulse-amplitude, the pulse-repetition rate or the ambient light intensity or frequency are not constant.

Another technique is to synchronize the electronics of the light source with the electronics of the measuring instrument (which may be either a photometer, radiometer, spectroradiometer, or colorimeter), so that an exact integral number (N=2, 3, 4, etc.) of pulses are measured. This technique is far more complex to execute, generally requires knowledge of the timing characteristics of the light source before the measurement is begun, and is subject to large errors if not executed properly.

If the measuring instrument were not properly synchronized with the light source several errors would occur. The "worst-case" example would be a multichannel-array spectroradiometer trying to measure a synchronous single pulse of light. Depending on the timing between the light pulse and the photodetector array in the spectroradiometer, the pulse could occur when some or all of the individual photodetectors were not ready to receive light which would produce an erroneously low reading from these photodetectors, which would result in large errors in the measurement data.

PRIOR ART

Three main techniques that have been used to measure AC or pulsed light sources are: integration of the measurement over many cycles; synchronizing the measurement circuitry to the timing of the light source; and using threshold-detection circuitry.

Integration of the measurement over many cycles is the simplest technique and involves integrating over a very large number (100 or more) cycles or pulses. This method, however, can take a great deal of time if the repetition rate is slow over time. This technique also can result in errors if either the pulse-amplitude, the pulse-repetition rate or the ambient light is not constant. Furthermore, in the case of a high-brightness pulsed-light source, this method required the use of an optical attenuator which can introduce errors into the measurement.

Synchronizing the measurement circuitry to the timing of the light source requires electronic circuitry to be assembled and physically connected in order to synchronize the light source and the measuring instrument. This technique is far more complex to execute, usually requires knowledge of the timing characteristics of the light source before the measurement is begun, and is subject to large errors if not executed properly.

Threshold-detection circuitry is used in some low-accuracy single-pulse or flashlamp exposure meters. This circuitry senses the rise of the light pulse, and then turns on the measuring system. The advantage of this method is that no physical connections to the source are required. However, since the first part of the light pulse is not measured, the results tend to be slightly erroneous. The error could be extremely large in a precision spectroradiometer, particularly if the measuring system consisted of a multichannel array which requires more precise synchronization.

The present invention has numerous advantages over the prior art including:

Compared to systems that integrate the light over a large number of cycles, the measuring time is shorter and therefore the throughput is greater. In the case of a high-brightness pulsed-light source, the new method is more accurate since it does not require the use of an optical attenuator which can introduce errors into the measurement.

Compared to systems that require synchronization circuitry, the invention results in an easy-to-use system that does not require anyone to design and assemble electronic synchronization circuitry, interfaces, etc. It also does not require any knowledge about the light source waveform, frequency or polarity before beginning to take measurements. Additionally, the present invention does not require any wires or other physical connections between the light source and the measuring instrument.

The present invention is far more accurate and reliable than systems that use threshold-detection accurately measured.

An additional advantage of the invention over the prior art is the ability to validate that the instrument is accurately measuring the light source; for example, the instrument could display an "error message" if the frequency changed during a measurement cycle, as would be the case if either the AC light-source frequency changed or the light source and measuring device physically moved with respect to one another during the measurement process or if the AC light source was swamped by ambient light of a different frequency.

SUMMARY OF THE INVENTION

An object of the present invention is to provide an accurate means to measure either intermittently or repetitively pulsed light sources without the need for integrating over a large number of pulse cycles in order to save time (increase throughput). An additional object is to measure a small number of cycles.

It is an object of the present invention to allow measurement repetitively pulsed light sources at the peak intensity of the light.

It is an further object of the present invention to allow this measurement to be made without prior knowledge of or external synchronization with the repetitively pulsed light source.

It is an additional object of the present invention to measure the period between pulses of the repetitively pulsed light.

It is still a further object of the present invention to provide an instrument which is capable of determining the repetition-rate or AC frequency of time-varying light sources.

The present invention provides a means of detecting and measuring the intensity of a pulsed incident ray of light, and synchronizing the measurement of the intensity over the duration of the pulse. A characteristic example would be measuring the intensity of a fluorescent light. The amplitude of the light output by a fluorescent light is pulsed by the AC power source, 60 cycles. Measurement must be made during the entire light cycle. (Note: each AC cycle has two cycles, one during the positive going portion of the cycle, and the other during the negative going portion of the cycle.

BRIEF DESCRIPTION OF THE DRAWINGS

FIG. 6 is a block diagram of a synchronization detector;

FIG. 7 is a schematic of a synchronization detector circuit; and

DESCRIPTION OF AN EXEMPLARY PREFERRED EMBODIMENT

The present invention is a system for optically sampling and electronically measuring the intensity characteristics of an intermittently or repetitively varying pulsed light source. The electronic output of the system can be used to display the data about the intensity as well as temporal characteristics of the source, and it can also be used to insure proper synchronization between the source and a secondary measuring system—such as a multichannel spectroradiometer or spectrocolorimeter.

The present invention will be described in terms of its two major sub-systems:

an optical system for acquiring a sample of the light source, and, an electronic system for measuring and displaying the intensity characteristics of the light source, and for providing synchronization signals to a secondary measuring system.

OPTICAL SYSTEM

There are many methods known for acquiring a sample of the output of a light source for measurement purposes while using the bulk of the main light beam for a different purpose in an optical instrument. For example, in a single lens reflex camera, methods commonly used include:

Sampling the light beam thru a beamsplitter in the reflex viewfinder;

Placing several photosensors around the periphery of the viewfinder; and

Reading the light reflected back from the film.

Figure 1:
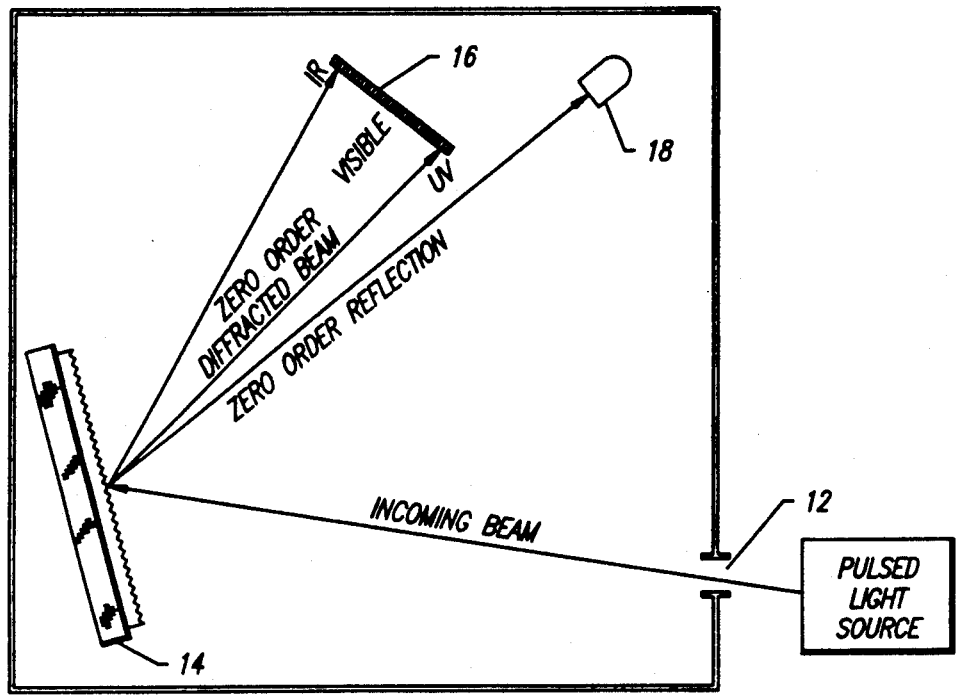
FIG. 1 is a zero Order Polychromator light-sampling optical system diagram.

The primary application of the preferred embodiment of the present invention is a precision multichannel array spectroradiometer, and the primary configuration of this invention was developed to take advantage of the unique nature of this type of spectroradiometer. As can be seen in FIG. 1, light that enters the "polychromator" 12 is reflected back from the diffraction grating 14 into several "orders," a higher one of which is used to illuminate the measuring photodetector array 16. The basic reflection from the diffraction grating 14, called the "zero order" may be an unmonochromated (white light) sample of the incoming beam, and is usually discarded since it interferes with the spectroradiometric measurement. However in the first configuration of the preferred embodiment of the present invention, the "zero order" reflection is used to provide an accurate sample of the light beam being measured and a small high-speed photodetector 18, such as a silicon photodiode or phototransistor is inserted into the polychromator so that it is illuminated by the "zero order" white-light beam. This photodetector is used to provide an electronic signal to the electronic circuitry. Charge Coupled Device (CCD) based photodetectors, or other photodetectors whose output is proportional to the intensity of the incident light are acceptable.

Figure 2:
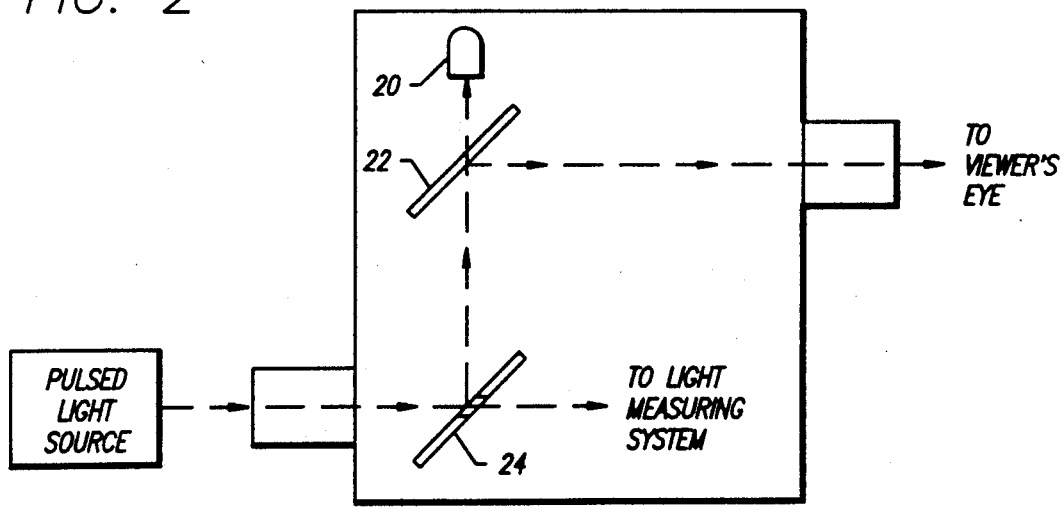
FIG. 2 is a diagram of a reflex-viewer beam splitter light-sampling optical system.

An alternate configuration is shown in FIG. 2. This configuration is not unique to multichannel-array spectroradiometers, so it can be used in any kind of photometer, radiometer, spectroradiometer or colorimeter. In this second configuration, the high-speed photodiode 20 is placed behind a beamsplitter 22 in the reflex-viewing system of a typical measuring instrument, such as a "PRITCHARD" photometer 24. In this location, the photodiode receives a sample of the light at or near the center of the optical beam.

In order to accurately synchronize a multichannel-array detector, such as a reticon or similar array to a repetitively pulsed light source, the frequency and the phase of the pulse train must be accurately known or measured.

The simplest circuitry that will perform this function is the classic analog phase-locked loop. The input to this circuit would be the signal from the light-sampling high-speed photodiode 18 or 20. The analog phase-locked loop consists of an analog phase detector feeding a voltage-controlled oscillator thru a low-pass filter. This signal is then fed back to the phase detector to stabilize the loop. The problem with this type of circuitry is that it is limited to a frequency range of approximately 2:1. Also because many analog components are used the circuit is bulky, has high power consumption, and is unreliable because of analog drift as a function of time and temperature. But the principal problem with analog phase-locked loops is the limited range of frequencies they can capture or lock-in, due to the requirements of the analog low-pass filter.

An improvement over the classic analog phase-locked loop is the digital phase-locked loop. These make [p-use of operator-programmable "Divide-by-M" counters to provide greater range. Unfortunately, these circuits are still bulky and complex, and require an analog low pass filter and require knowledge of the light-pulse frequency before beginning the measurement, in order for the operator to properly set the "Divide-by-M" counters.

The electronic system of the present invention, called a "digital phase locked loop" (DPLL) system does not require any knowledge of the light-pulse frequency prior to beginning the measurement, nor does it require any human intervention to set counters. It is capable or automatically setting itself over a frequency range in excess of 10:1. Furthermore, it is compact, has low power consumption, and is reliable in part because of the lack of unstable analog components. Additionally, the system lends itself to displaying information concerning the light-source frequency, and changes in frequency (which might prompt "error messages") to the operator on an easy-to-read digital display.

Figure 3:
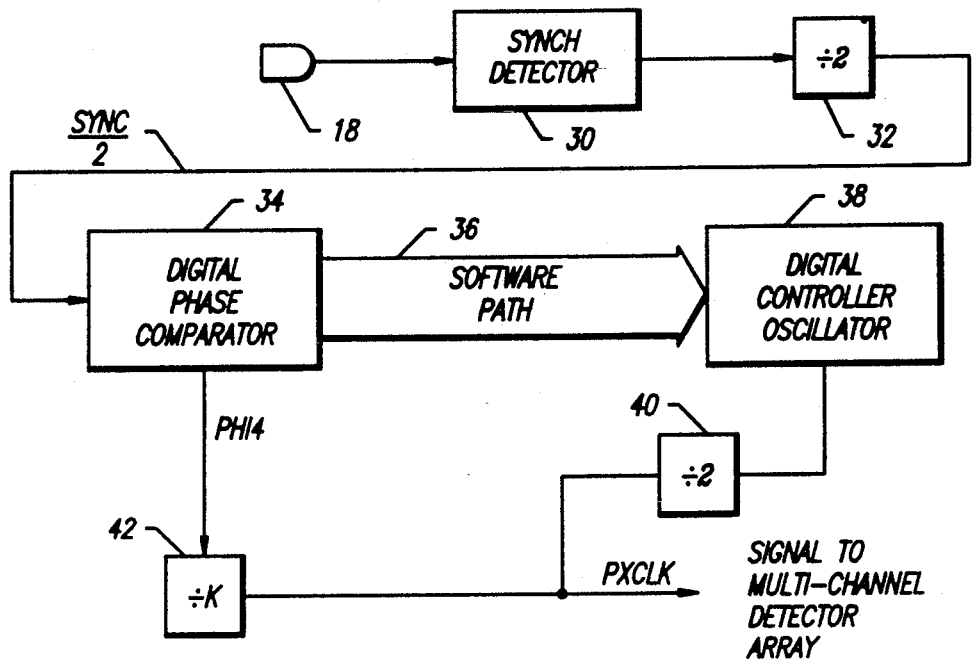
FIG. 3 is a block diagram of a digital controlled oscillator.

The DPLL system consists of both hardware and software is shown in block diagram form in FIG. 3. The output of the light-sampling high-speed photodiode 18 or 20 is fed to a synch detector 30. The output of the synch detector is fed to a "Divide-by-2" counter 32, which serves to eliminate the variations usually found between the two half-cycles of a light source waveform. For example, a 60-hertz voltage input to a fluorescent lamp results in a 120-hertz light-output signal in which the two half cycles are typically slightly different. The output of the "Divide-by-2" counter is then fed to a digital phase comparator 34. This comparator consists of both hardware and software. One of the software outputs of this digital phase comparator is a signal called "ΔDCO" ("DELTA-D.C.O.") which is a measure of the change in phase angle between the pulsed light source and the scan frequency of the multichannel detector array, expressed in integral (integer or whole number) units of the DCO incremental clock rate "DELTA-D.C.O." is computed from the following formula:

ΔDCO = Absolute, Integral Value of $$\frac{T_n - T_{(n-1)}}{M} \cdot \text{Modulo 1}$$

Where: $T_n$ = The measured phase difference between the photodetector scan clock and the pulsed light source for the nth pulse cycle, $T_{n-1}$ = The measured phase difference of the previous (n−1) pulse cycle, M = A configuration constant analogous to the low pass filter in a conventional analog phase locked loop.

Thus "DELTA-D.C.O." will be equal to zero when the light-source pulse frequency (times 2) is the same as the photodetector's scan frequency, and positive greater-than-zero values when the difference in time period between two successive pulses exceeds the value of "M." This "DELTA-D.C.O." software signal is fed to the digital controlled oscillator 38, where it is used to change the oscillator frequency. The output of the D.C.O. is first passed thru a "Divide-by-2" counter 40 and then thru a "Divide-by-K" counter 42 before it is fed back to the phase comparator 34 to match the frequency of the incoming light signal; "K" is a constant which is related to the number of elements in the multichannel detector array 16. The output of the D.C.O. passed thru only the "Divide-by-2" counter is used to drive the multichannel detector array 16.

The result of changing the DCO frequency in response to measured differences in phase between the pulsed light source and the photodetector is that the photodetector's scan frequency is forced to approximate the frequency of the pulsed light source, thereby achieving a definite phase lock.

Figure 4:
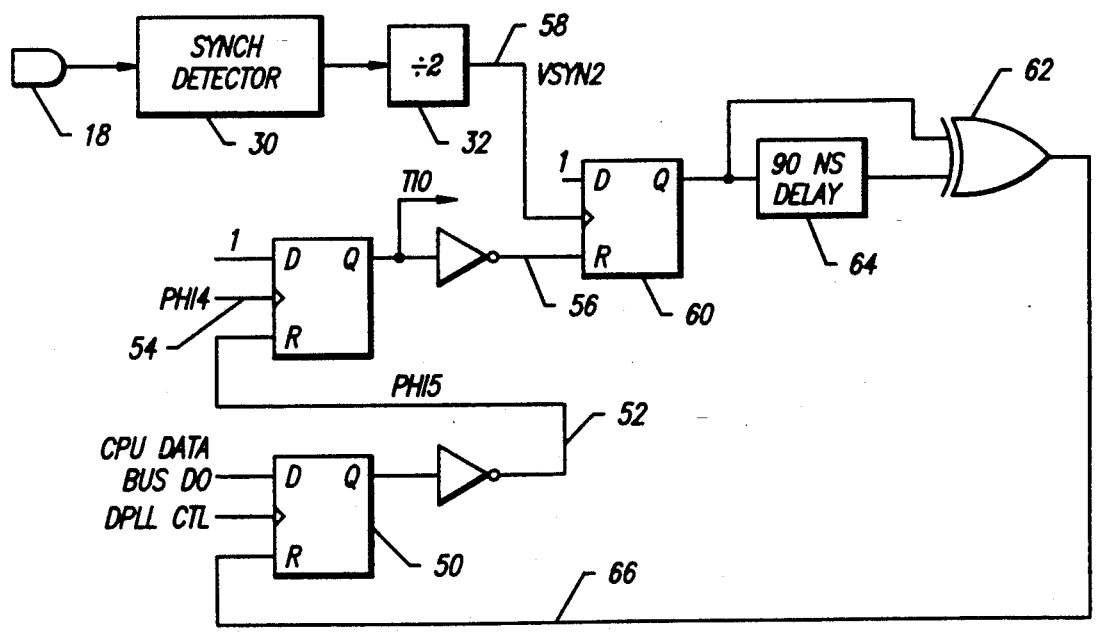
FIG. 4 is a block diagram of a digital phase comparator.

The unique phase comparator is shown in greater detail in FIG. 4. The digital phase locked loop (DPLL) of this invention differs from analog phase locked loops (PLL), as well as other DPLLs that have an analog controlled oscillator that can take on a continuous range of values in response to a continuous control signal (usually a voltage, thus the name "voltage-controlled oscillator"). The previous systems can, in theory, exactly match the input frequency to any degree necessary, subject only to drift which theoretically will be automatically adjusted by their internal phase-locking servo system. However, those systems are severely limited in the range of frequencies they can handle, while the DPLL of this invention is not.

The digital controlled oscillator (DCO) of this invention's DPLL can only take on discrete (integral) values, and thus can only approximate the input frequency. This approximation is actively achieved by varying the DCO from its closest frequency above the input frequency to its closest frequency below the input, therefore the long-term average tends to approach the exact input frequency.

The DPLL of this invention is useful in situations where the input frequency need not be exactly matched, but only need be approximated. For example, in a spectroradiometer or spectrocolorimeter using a multichannel-array photodetector the error in frequency match is the DCO incremental period times the factor 2K, where "K" is a constant related to the number of elements in the multichannel detector array. In the particular case of the 128-element photodetector array used in this invention, K equals 132. In this case, the error is equal to 0.03125 microseconds times 2 times 132 which is equal to 8.1875 microseconds. This error can be reduced by decreasing the DCO incremental period, or by decreasing the value of K (if possible).

Figure 5:
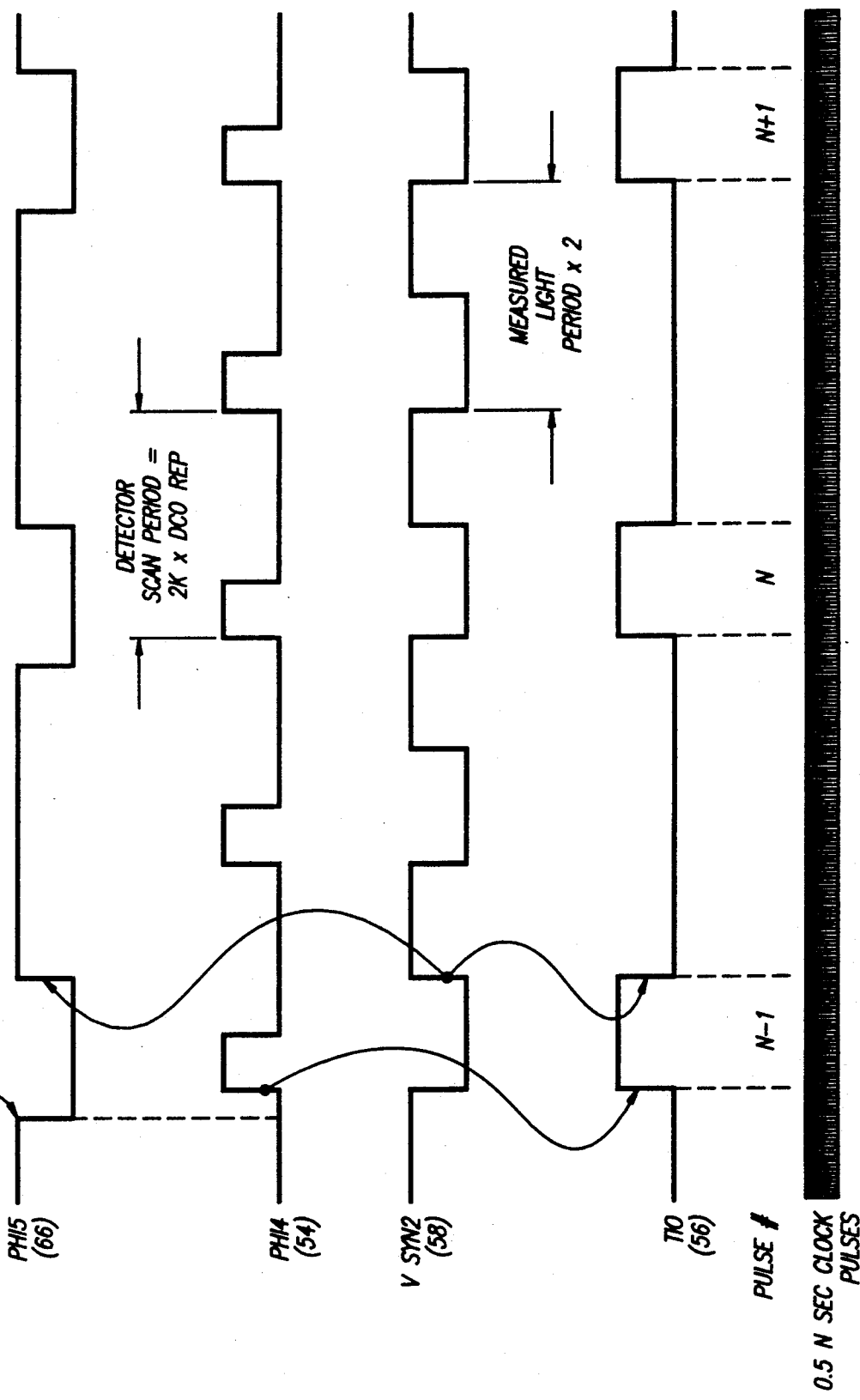
FIG. 5 is a timing diagram for the digital controlled oscillator portion of the digital phase locked loop.

The timing diagram for the circuitry is shown in FIG. 5. Following the software lowering the reset of FF3 50, which lowers the "PHI5" signal 52, the positive-going edge of PHI4, 54 signal starts the measurement of phase, the "TI0" signal) 56. The PHI4 signal is derived from, and has the same period as the multichannel photodetector's scan frequency. The positive-going edge of the "VSYN2" signal 58 ends the measurement of phase, thereby producing a "TI0" signal which has a pulse width proportional to the difference, that is, the phase angle between PHI4 and VSYN2. The "VSYN2" signal 58 is derived from the sampling photodetector in the optical instrument after passing through the sych-detector and a "Divide-by-2" counter. The period of the VSYN2 signal is equal to twice the period of the light-input signal being measured (e.g., 20 milliseconds for a light frequency of 100 hertz).

As shown in FIG. 6, the synchronization detector of the present invention consists of a logarithmic amplifier 250 which is coupled to a comparator 252 which acts as a peak detector and is followed by a retriggerable one-shot 254. This signal is then run through a divide by two network and provides the input for the digital phase comparator.

The logarithmic amplifier of the present invention is comprised of a differential operational amplifier 256 which in the present preferred embodiment is an AD744. While the differential capabilities of this device are not utilized in the present configuration, with the selection of an appropriate photodetector, a differential amplifier, or a dual differential amplifier such as a video amplifier circuit could be used. The logarithmic amplifier is followed by a band pass filter 258 which is configured to pass frequencies in the range of 10 Hz through 1 Khz. The filtered signal is then fed into a zero crossing detector 252 which consists primarily of a comparator 260 such as an LM311. If a dual differential device such as a video amplifier was used in the first stage logarithmic amplifier position, an LM311 could still be used, but would be configured to drive both the positive and negative inputs of the LM311. Another alternative embodiment of the present invention could consist of a peak detector, or an amplifier followed by a differentiator and a zero crossing detector, or equivalent circuitry.

The output of the zero crossing detector 252 is then fed into a low pass filter 262 which consists of a retriggerable one shot 264 which in the preferred embodiment is a 74HCT221. The purpose of the one shot is to filter out high frequency components which may be output by the zero crossing detector. This signal then drives a digital phase comparator which in turn drives the digital controlled oscillator.

In the implementation of the present invention, the signal shown in FIG. 4 at TI0 is a square wave, wherein the phase difference between the photodetector signal and DCO pulse is proportional to the width of the pulse appearing on TI0. This signal, TI0 is then fed into a computer aided system and process which measures the width of pulse TI0 relative to the frequency of the computer's clock, and generates a value for Delta DCO based on the formula previously given. The Delta DCO signal then drives the input for the digital controlled oscillator 38.

The digital controlled oscillator of the present invention further consists of a thirteen bit hold register which in turn drives a parallel loadable down counter. The thirteen bit hold register is loaded first with the lower eight bits, and then the upper five bits from the computer aided system and process embodying the digital phase comparator. The down counter is clocked at a rate of 32 MHz, and its output is divided by two to generate the PX clock signal. PX clock is then fed back to the multi-channel detector array 16 where it is used as the master clock.

The multi-channel detector array consists of a discrete number of individual photodetectors, in the preferred embodiment 128 individual photodetectors. The multi-channel detector array provides sequential scanning of the individual photodetectors in the array, and increments to the next element each time a clock signal is supplied. The clock signal used to drive the multi-channel array is PX clock. The multi-channel detector array provides an analog output for the particular photodetector cell which is being scanned. This analog output provides the input to the analog to digital converter where its value is placed into the computers memory and subsequently processed.

The goal of the apparatus is to have the digital clock, PX clock synchronized with the analog measurement circuitry so that the analog measurement is made during an exact integral number of pulses of the light source.

Figure 8:
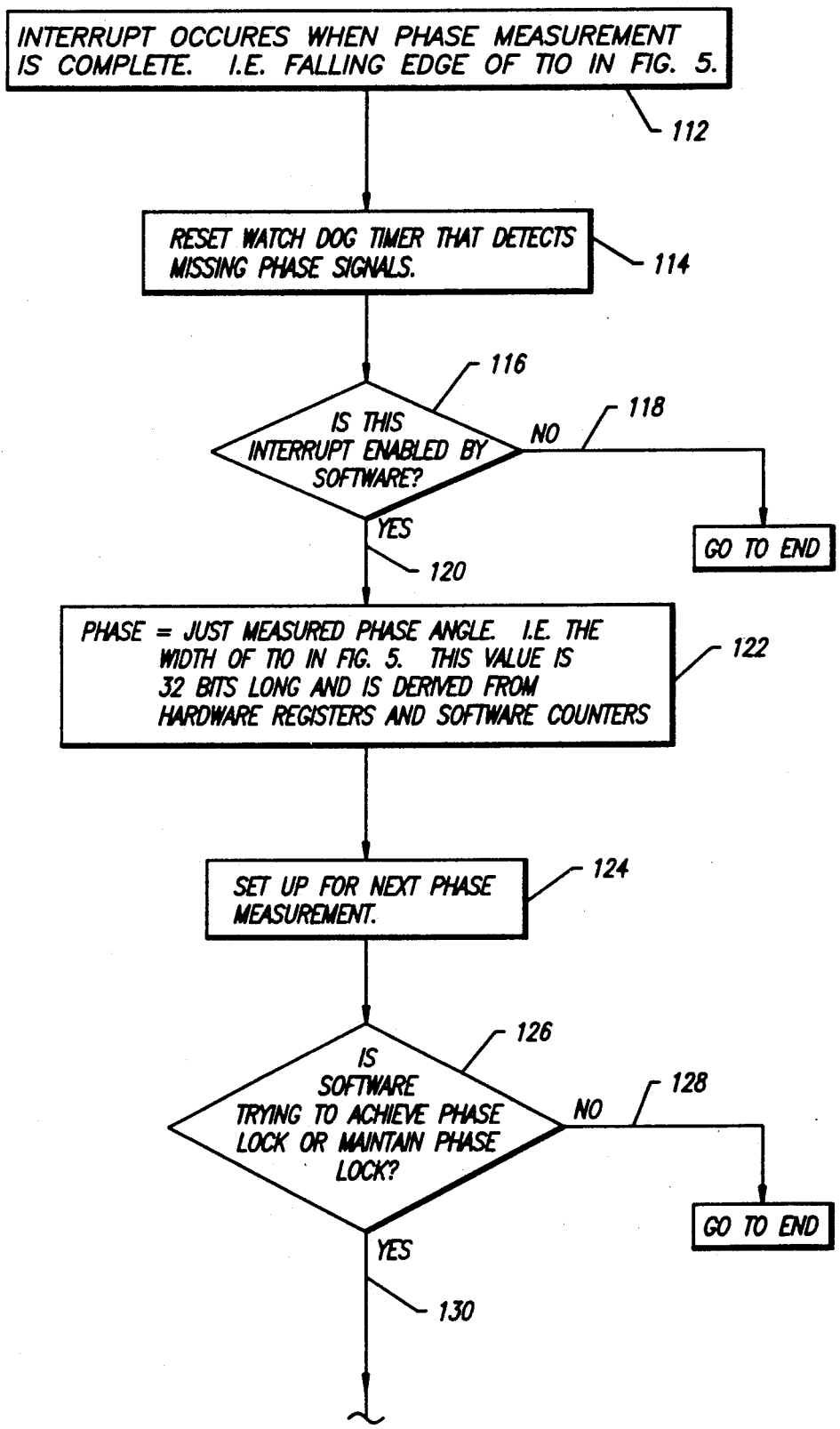
FIG. 8A-8D is a flow chart showing operation of the digital phase locked loop.
Figure 8A:
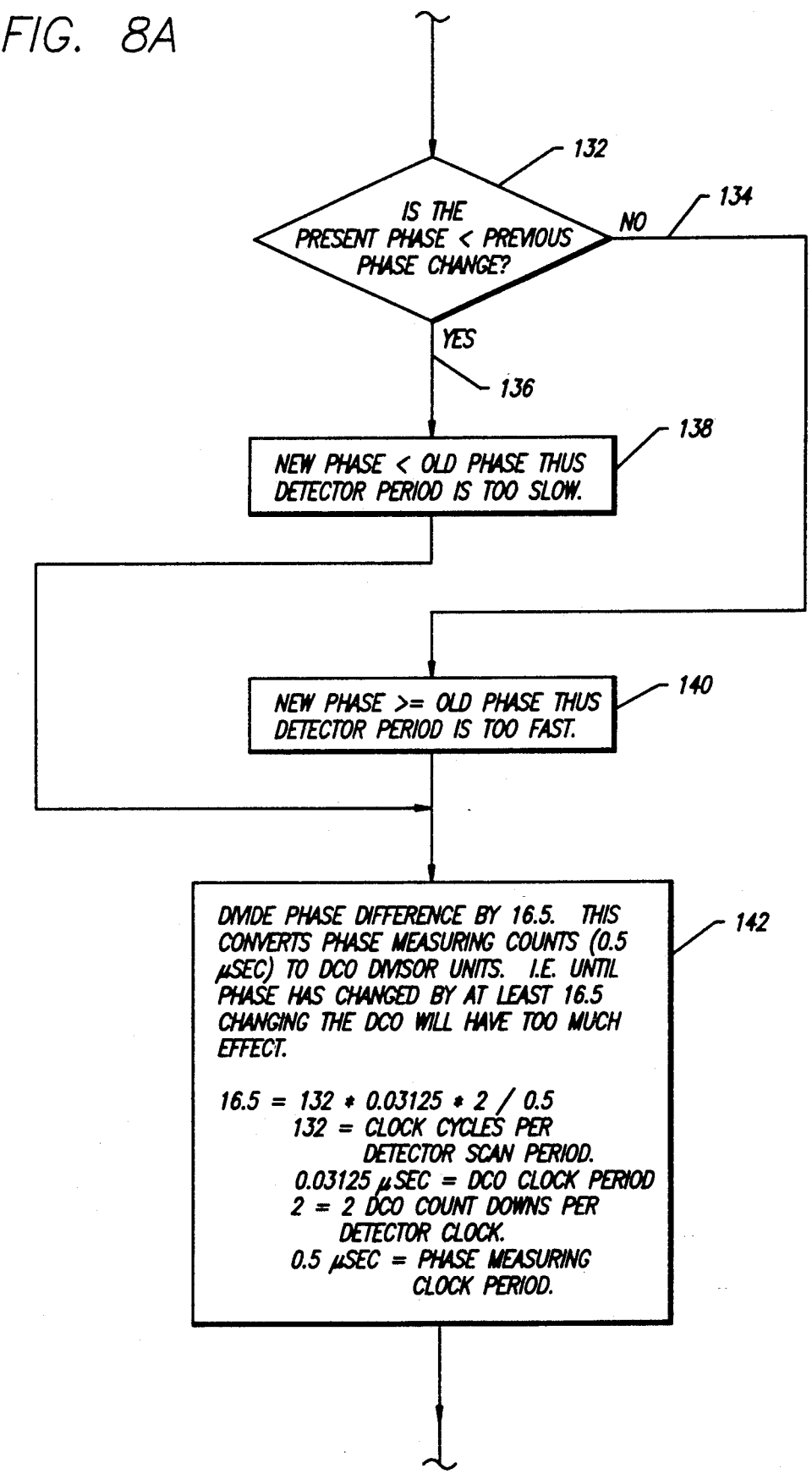
Figure 8B:
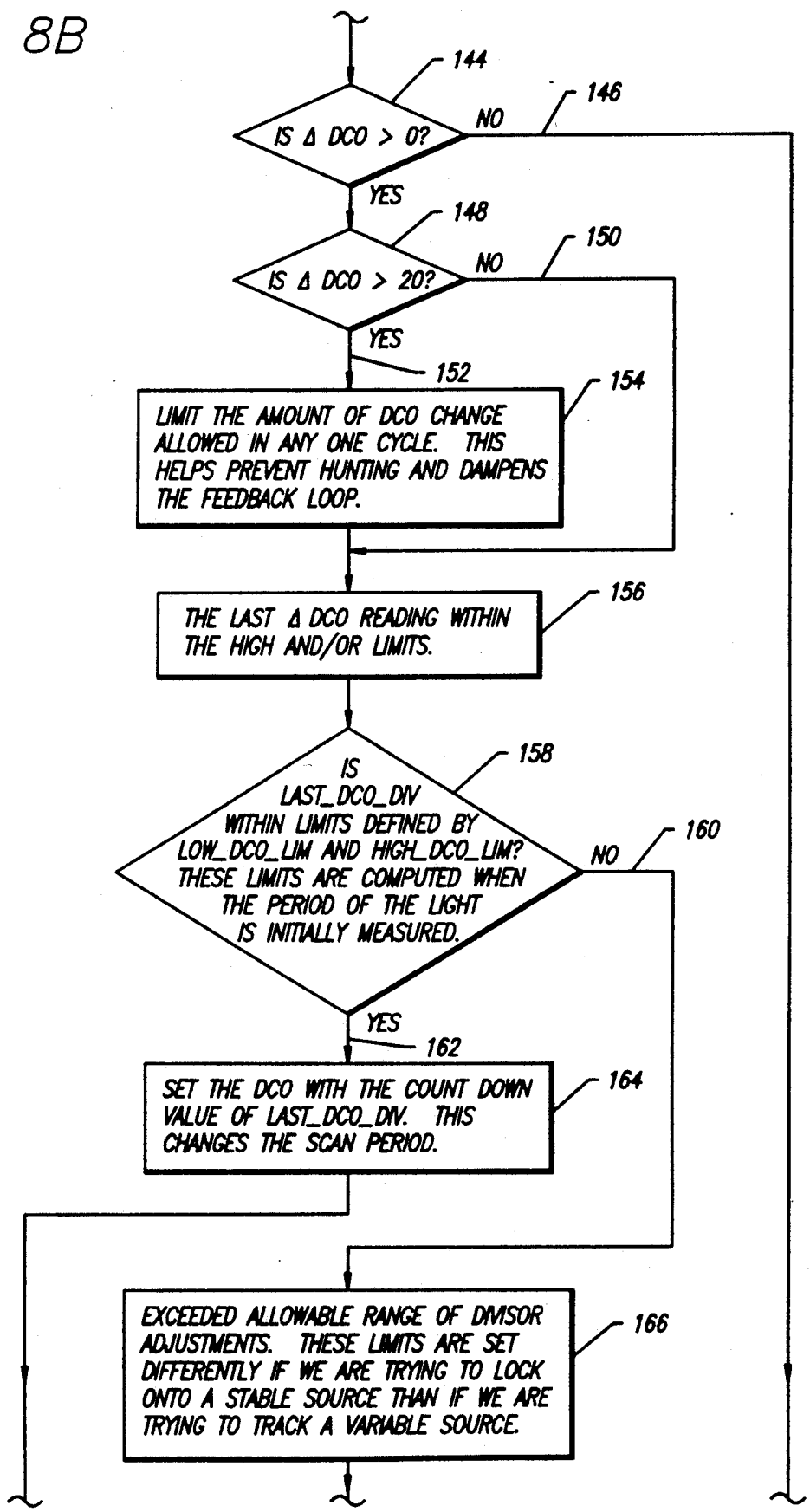
Figure 8C:
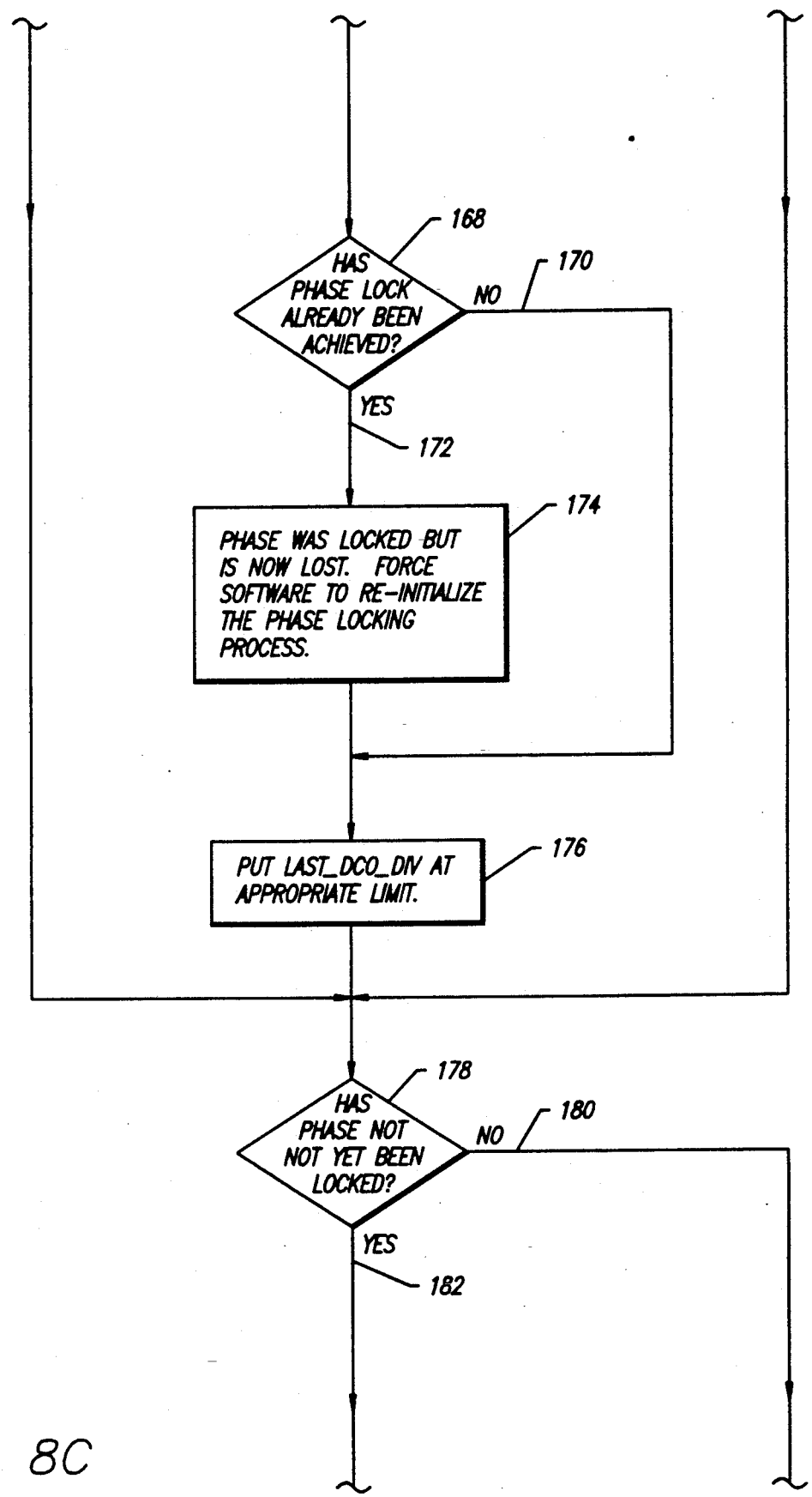
Figure 8D:
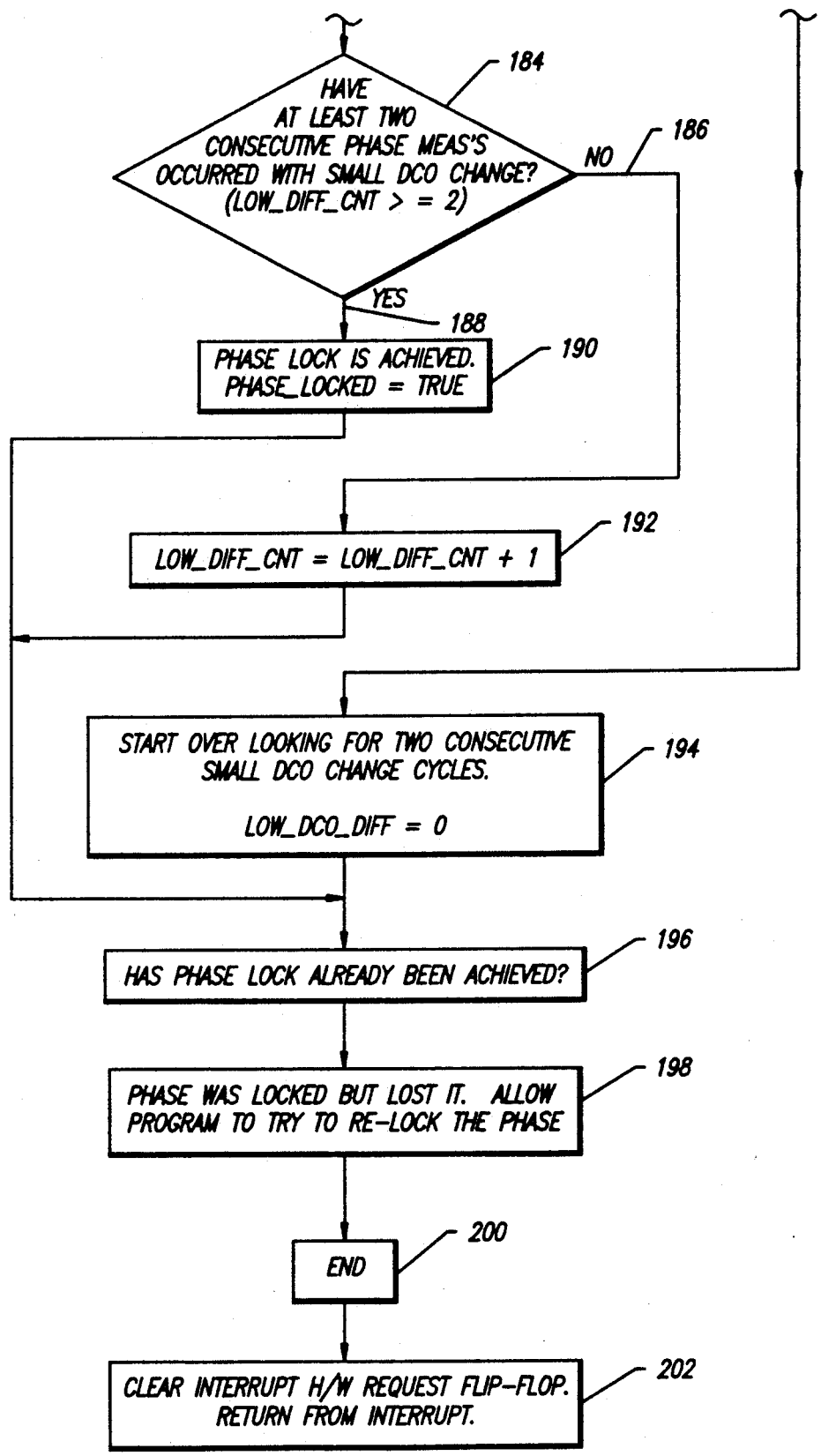

The computer aided system and process comprising the digital phase comparator is further described in FIGS. 3 and 8. The computer aided process begins on the falling edge of TI0 when the processor is notified that phase measurement is complete 112. The processor first resets a watchdog timer 114 so as to detect missing phase signals and prevent lock up of the processor. The processor then checks to see whether the interrupt was enabled by software 116. If the interrupt was not enabled by software, the processor will skip to the end of the routine 200, and then will clear the hardware request interrupt flip flop 202 and await the next interrupt signal 112.

As the interrupt is almost always enabled by software 120, the processor will proceed to the next step where it measures the phase of TI0 122. The phase angle counter itself is thirty-two bits long and is derived from the hardware registers and software counters. By counting the number of pulses during which TI0 is valid, the duration of TI0 is measured. Since the duration of TI0 is proportional to the phase difference between the system clock (PX clock) and the synchronization detector, a valid numerical value representative of synchronization is generated.

Since the processor must compare the present value of the phase with the immediate past value of the phase, and only one measurement has been taken, the processor then sets up for the next phase measurement 124. At this point the processor will attempt to determine whether it is trying to achieve or maintain phase lock 126. If the processor is not trying to achieve phase lock 128 then the processor will proceed to the end of the program 200 and clear the interrupt hardware flip flop 202 and await the next interrupt. This will typically occur when only one phase measurement has been made.

If the software determines that it is trying to achieve or maintain phase lock 130 then it will compare the number of clock pulses counted during the present phase with the number of clock pulses counted during the immediate preceding reading 132. If the present count is less than the previous count 134, then the processor will determine that the new phase is greater than the old phase and the detector period is too slow 140. If the new phase is less than the old phase 136 then the processor will determine that the detector period is too slow 138.

Regardless of whether the absolute phase difference is set at a positive or negative value, the processor will then determine the DC0 difference 142 by dividing the phase difference by 16.5. This will insure that an integral number of DC0 divisor units (0.5 microseconds) is used. If the phase difference is less than 16.5, then DC0 DIFF will be set to 0. This condition occurs when synchronization has been achieved. The purpose of this step is to dampen the feed back loop, and prevent the circuit from changing the DCO clock if the change will have too great an effect on synchronization, and itself cause errors to be introduced into the process.

If the absolute value of the DC0 difference is not greater than zero 146 then the processor will proceed to block 178. If it is greater than zero, then the processor will check to see if the absolute value of the DC0 difference is greater than twenty, 148. This is another dampening portion of the feed back network which is used to prevent the system from making very large changes in the DC0 during any one cycle in order to prevent a characteristic known as hunting, which will occur if the feed back loop is underdamped or critically damped.

If the absolute value of the DC0 difference is greater than twenty, 152 then the system will limit the change in value to a maximum of twenty, 154. If the absolute value of the DC0 difference is not greater than twenty 150, then the system will allow the actual value of DC0 difference to be used. At this point the system will store the DC0 difference as calculated, 156 for use during the next cycle, which follows the next sequential interrupt.

The processor next checks to see whether this value is within the high and low limits, 158, that have been previously established. These high and low limits are computed when the period of the light is initially measured. If the value is within the high and low limits 162, then the processor will set the digital controlled oscillator with the count down value of the present measurement, 164. The processor will then proceed to step 178.

If the value is not within the high and low limits, 160, then the processor will note that it has exceeded the allowable range of divisor adjustments, 166. The particular divisor adjustments used are set differently depending whether the light source is variable or stable. Even if the processor determines that it has exceeded the allowable range of divisor adjustments, it will test to see whether phase lock has been achieved 168. If phase lock had been achieved 172, then the processor will note that phase lock has since been lost 174. The processor will then reinitialize the phase locking process. If phase lock has not yet been achieved, 170 then the processor will set the value of the DC0 divisor at the appropriate high or low limit, 176 and proceed to block 178.

Block 178 tests to see whether phase lock has been achieved and whether the change in the DC0 is a small one. If the change is large 180, then the processor will start over looking for two consecutive small DC0 change cycles 194 and will set the low DC0 difference flag to false (zero). If phase lock has been achieved and the DC0 change is small i.e., DC0 difference is less than or equal to one 182, then the system will check further to see if there had been two consecutive measurements with small DC0 changes 184. If there are two consecutive phase measurements with small DC0 changes resulting 188, then the processor will note that phase lock has been achieved 190.

If there have not been two consecutive measurements resulting in a small DC0 change, then the processor will increment the low difference counter by one. At this point, the processor will check to see whether phase lock has been achieved and the digital controlled oscillator change is large, i.e., greater than ten, 196. If the DC0 change is large, then the processor will determine that phase lock has been lost 198, and will set the phase lock indicator false. At this point the processor will end the routine 200, a clear the hardware interrupt flip flop 202 and return from the interrupt request (at this point the processor is ready to receive the next interrupt on the next falling edge of TI0, 112).

When measuring pulsed light, the measurement starts after phase lock has been achieved. If phase lock is lost during the eight measurement, the measurement is aborted process.

The invention described herein would be useful in any precision photometer, radiometer, spectroradiometer or colorimeter. It would also be useful as a "stand-alone" light-pulse frequency meter. It could also be beneficial in a sample-measuring spectrophotometer, in which case it could monitor the internal light source to determine if it is varying in frequency, or if the internal light source is being swamped by external light sources.

The invention is particularly useful in a multichannel-array spectroradiometer. The first specific example of its intended use as a multichannel-array spectroradiometer, photometer and colorimeter.

There has been described hereinabove a novel spectral intensity measuring system for repetitively pulsed light which includes means for counteracting the effects of variation in the repetition rate and the effects of variations in light measuring instruments according to the principals of the present invention as described hereinabove. Variations may be made by using a single photodetector. The photodetector may be a phototransistor, photodiode, charge coupled device or other light sensitive device. The diffraction grading may be replaced by a prism, or other object which will separate the incident ray of light into its spectral components. The logarithmic amplifier in the synchronization detector can be replaced by a linear amplifier, a differential amplifier, or a dual differential amplifier. The peak detector circuitry of the synchronization detector can be replaced by a differentiator and zero crossing detector, or the like. The digital phase comparator may be modified to consists of gates and/or flip flops, or may be eliminated all together in favor of a software routine that directly measures the time difference between the output of the synchronization detector and the digital oscillator. The software may be massaged in numerous ways to change the damping effect, to change the measurement approach, or to change any of the constants. In particular the software could be changed to allow it to trace a light source whose frequency varies over a wide range. The digital controlled oscillator may be replaced by an upcounter, or may be incorporated into the microprocessor portion of the invention so that a separate device is no longer required.

Those skilled in the art may now make numerous uses of and departures from the above described embodiments without departing from the inventive concepts which are described by way of example, and not by way of limitation by the claims which follow.

I claim:

1. A spectral intensity measuring system for repetitively pulsed light comprising:
   a photo-detector which senses the presence ambient light, collimated or uncollimated;
   a multi-channel detector array in which each of the discrete channels of the array detect the presence, and/or intensity of discrete wavelengths of light;
   an electronic measuring and adjustment system including a digital phase locked loop which synchronizes the measurement of the incident light such that measurement is taken during the peak period of the incident light based on the repetition rate, within the limits possible based on the operating frequency of the digital phase locked loop and the number of elements in the multi-channel detector array.

2. A spectral intensity measuring system for repetitively pulsed light as described in claim 1, in which the digital phase locked loop further comprises a synchronization detector means connected to the ambient light detector, and driving a digital phase comparator, said digital phase comparator in turn driving a digital controlled oscillator which in turn generates a clocking signal to the multi-channel detector array.

3. A spectral intensity measuring system for repetitively pulsed light as described in claim 2, wherein the digital phase comparator further consists of hardware and a computer aided system and process for evaluating the presence and magnitude of the phase difference between the present measurement and the immediately preceding measurement and adjusting the system clock to substantially conform to and coincide with the peak detected by the synchronization detector circuitry.

4. A spectral intensity measuring system for repetitively pulsed light as described in claim 3, wherein in the computer aided system and process includes an algorithm which overdampens the feedback loop by limiting the magnitude of the phase change which may be called for based on the difference between the present reading and the immediately preceding reading of the photodetector.

5. A spectral intensity measuring system for repetitively pulsed light as described in claim 3, wherein the digital phase comparator further consists of a digital logic network.

6. A spectral intensity measuring system for repetitively pulsed light including means for measuring the intensity of light comprising:
means for detecting when the amplitude of a beam of light reaches a pre-determined threshold amplitude;
synchronizing means for synchronizing the measuring of the amplitude of the beam of light when the amplitude of the beam of light exceeds the predetermined amplitude;
said synchronizing means including a variable frequency oscillator whose output frequency is varied to be proportioned to the repetition rate of the repetitively pulsed light.

7. A spectral intensity measuring system for repetitively pulsed light as described in claim 6 in which the means for synchronizing the amplitude of light with the maximum amplitude detected comprises a feedback loop, and wherein said feedback loop contains one or more digital elements.

8. A spectral intensity measuring system for repetitively pulsed light as described in claim 7 wherein the means for synchronizing measuring the amplitude of light at said maximum amplitude detected comprises a means for digitally synchronizing said measurement.

9. A spectral intensity measuring system for repetitively pulsed light as described in claim 7 in which the digital means for synchronizing the measurement of the amplitude of light with the maximum amplitude detected further comprises a digital phase locked loop means which comprising:
a computer aided system and process further comprising computing means for measuring the difference in time between the pulse generated by the synchronization detector and the pulse generated by the system to measure the amplitude of the incident light, and generating a correction factor, or otherwise altering the synchronization signal; and
a digital controlled oscillator means which is driven by the computer aided system and process to generate a synchronization signal of the proper frequency and phase, as determined by the computer aided system and process.

10. A spectral intensity measuring system for repetitively pulsed light as described in claim 9 in which the digital means for synchronizing the measurement of the amplitude of light with the maximum amplitude detected further comprises a digital phase locked loop means which comprises a hardware means for generating a digital pulse whose length is proportional to the difference between the maximum intensity and the synchronization signal generated by the digital phase locked loop;

11. A spectral intensity measuring system for repetitively pulsed light as described in claim 8 in which said computer aided system and process includes means for dampening the feedback loop created by the detection means and the synchronization means;
the computer aided system and process further being capable of detecting whether synchronization has been achieved and the phase locked loop has "locked" within predetermined parameters.

12. A spectral intensity measuring system for repetitively pulsed light as described in claim 6 which also includes means for diffracting an incident ray of light, separating the diffracted light into a spectrum of diffracted light where the diffracted light is divided into a spectrum of light of various wavelengths; and
in which the system for means for measuring the intensity of light further includes means for measuring the intensity of or a limited number of specific, discrete wavelengths of light.

13. A spectral intensity measuring system for repetitively pulsed light as described in claim 6 which additionally includes means for filtering out lower than desired and higher than desired frequency components where the desired frequency component represents the rate of change of the intensity measurement.

14. A spectral intensity measuring system for repetitively pulsed light as described in claim 6 in which the means for detecting the maximum amplitude of the wavelength of light to be measured further comprises a peak detector.

15. A spectral intensity measuring system for repetitively pulsed light as described in claim 6 in which the means for synchronizing further comprises means for implementing a digital phase locked loop.

16. A spectral intensity measuring system for repetitively pulsed light comprising:
a light detector capable of detecting incident light, and capable of generating a signal whose intensity is proportional to the intensity of the incident ray of light; and
an electronic measuring and adjustment system which synchronizes the measurement of the amplitude of the incident ray of light with the peak amplitude of the incident ray of light.

17. A spectral intensity measuring system for repetitively pulsed light as described in claim 16 in which the light detector further comprises a multichannel detector array in which each of the light detector cells of the array respond to a limited range of incident light wavelengths.

18. A spectral intensity measuring system for repetitively pulsed light as described in claim 16 in which the electronic measuring and adjustment system further comprises a synchronization detector, digital phase comparator, computer aided system and process, and a digital controlled oscillator, said synchronization detector detecting the peak amplitude of the incident light and generating a digital signal upon detection of the peak amplitude of the incident light, computer aided system and process comparing the signal generated by the synchronization detector with the signal which is output by the digital controlled oscillator, and modifying the phase and/or frequency of the digital controlled oscillator in order to match the signal generated by the digital control oscillator with the signal generated by the synchronization detector.

19. A spectral intensity measuring system for repetitively pulsed light as described in claim 16 in which the electronic measuring and adjustment system further comprising a synchronization detector, digital phase comparator, computer aided system and process, and a digital controlled oscillator, said synchronization detector detecting the peak amplitude of the incident light and generating a digital signal upon detection of the peak amplitude of the incident light, said digital phase comparator comparing the signal generated by the synchronization detector with the signal which is output by the digital controlled oscillator, and generating a signal which is proportional to the difference between the signal from the synchronization detector and the signal generated by the digital control oscillator, and modifying the phase and/or frequency of the digital controlled oscillator in order to match the signal generated by the digital control oscillator with the signal generated by the synchronization detector.

20. A spectral intensity measuring system for repetitively pulsed light as described in claim 19 in which the synchronization detector further comprises of an amplifier, and a zero crossing detector, the output of the amplifier driving the input of the zero crossing detector.

21. A spectral intensity measuring system for repetitively pulsed light as described in claim 20 in which the synchronization detector further comprises a band pass filter to filter out undesired low frequency or high frequency components, and additionally having a retriggerable one shot whose input is connected to the output of the zero crossing detector, and whose output further drives the digital phase comparator, said retriggerable one shot inherently acting as an additional low pass filter.

22. A spectral intensity measuring system for repetitively pulsed light as described in claim 16 in which the digital phase comparator further comprises of a logic array which generates a pulse whose proportional to the difference between the phase of the digital controlled oscillator and the phase of the output of the synchronization detector.

23. A spectral intensity measuring system for repetitively pulsed light as described in claim 16 in which the computer aided system and process further comprises of routines to measure the difference between the phase of the digital controlled oscillator and the digital phase comparator, and adjust the frequency, and/or phase of the digital controlled oscillator so that the output of the digital controlled oscillator substantially conforms to the signal generated by the synchronization detector.

24. A spectral intensity measuring system for repetitively pulsed light as described in claim 23 in which the computer aided system and process further comprises of routines or subroutines which limit the extent by which the digital controlled oscillator frequency and/or phase is changed as the result of any two consecutive measurements, said limitation serving to dampen the feedback loop.

25. A spectral intensity measuring system for repetitively pulsed light as described in claim 24 in which the limitation serves to overdampen the feedback loop.

26. A spectral intensity measuring system for repetitively pulsed light as described in claim 16 in which the digital controlled oscillator further comprises of a loadable counter.

27. A spectral intensity measuring system for repetitively pulsed light as described in claim 26 in which the digital controlled oscillator further comprises of a parallel loadable countdown counter.

28. A spectral intensity measuring system for repetitively pulsed light as described in claim 16 which additionally is capable of measuring the pulse rate.

29. A spectral measuring device comprising:
means for detecting a periodically recurring signal;
digital phase lock loop means;
an internal clock with said recurring signal by means of said digital phase locked loop means so as to allow phase locking to signals whose period varies by a factor greater than 10.

* * * * *